(12) United States Patent
Briceno et al.

(10) Patent No.: US 8,281,125 B1
(45) Date of Patent: Oct. 2, 2012

(54) SYSTEM AND METHOD FOR PROVIDING SECURE REMOTE EMAIL ACCESS

(75) Inventors: Marc A. Briceno, San Jose, CA (US); Rajiv U. Dholakia, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 475 days.

(21) Appl. No.: 12/507,650

(22) Filed: Jul. 22, 2009

Related U.S. Application Data

(60) Provisional application No. 61/152,154, filed on Feb. 12, 2009.

(51) Int. Cl.
*H04L 29/06* (2006.01)
(52) U.S. Cl. .................... 713/153; 707/741
(58) Field of Classification Search .......... 713/153, 713/189, 193, 165, 179; 709/206, 207; 707/715, 707/741
See application file for complete search history.

(56) References Cited

U.S. PATENT DOCUMENTS

| | | | | |
|---|---|---|---|---|
| 6,640,301 | B1 * | 10/2003 | Ng ................................ | 713/156 |
| 7,853,602 | B2 * | 12/2010 | Gorti et al. ..................... | 707/753 |
| 2002/0144148 | A1 * | 10/2002 | Hashem et al. ................ | 713/201 |
| 2006/0166650 | A1 * | 7/2006 | Berger et al. ................. | 455/412.1 |
| 2007/0208941 | A1 * | 9/2007 | Backer .......................... | 713/170 |
| 2010/0036813 | A1 * | 2/2010 | Cameron et al. ................ | 707/3 |
| 2010/0145970 | A1 * | 6/2010 | Gorti et al. .................... | 707/759 |
| 2010/0186062 | A1 * | 7/2010 | Banti et al. ....................... | 726/1 |

* cited by examiner

*Primary Examiner* — Beemnet Dada
(74) *Attorney, Agent, or Firm* — Fenwick & West LLP

(57) ABSTRACT

A computer-implemented system and method for providing secure remote document access is provided. An index is created for the documents in a local document store. The resulting index is provided to a remote search server that operates independently of the local document store. Each document in the document store is also encrypted and provided to a remote document server that operates independently of the local document store. The encrypted documents can be located using the index on the remote search server and can be retrieved from the remote document server using an identifier obtained from the remote search server.

20 Claims, 5 Drawing Sheets

SYSTEM AND METHOD FOR PROVIDING SECURE REMOTE EMAIL ACCESS

CROSS-REFERENCE TO RELATED APPLICATION

This non-provisional patent application claims priority under 35 U.S.C. 119(e) to U.S. Provisional Patent Application Ser. No. 61/152,154, filed Feb. 12, 2009, the disclosure of which is incorporated by reference.

FIELD

This application relates in general to digital data access and, in particular, to systems and methods for providing secure remote document access, as well as access to other forms of digital data.

BACKGROUND

Some entities use third-party Web mail systems (such as are provided by Microsoft, Google, and Yahoo) as emergency or high-availability backup email systems for existing, primary systems. To do so, typically, a "mail forward" is set up in which every email sent to a user at a primary address (e.g., sent to the email address joe.miller@company.com) is also sent to a Web mail address (e.g., jmiller123@gmail.com). If the user's primary mail server (company.com in this example) fails or is otherwise not accessible, the user can continue to access his or her email via the third-party Web mail system (e.g., gmail.com).

Unfortunately, storing sensitive emails outside the security and trust boundary of a corporate or similar email server can introduce risk. For example, some web mail providers sometimes search and data mine email contents to serve targeted advertising. When the email content comprises simple messages pertaining to greetings and online shopping receipts, this behavior may be benign and even possibly desirable. However, if the email content comprises trade secrets, confidential business intelligence, or other sensitive information, a problem arises. As but one example, employees at the Web mail provider may trade stocks opportunistically based on insider information gleaned from the Web-mail email copies. As another example, employees at the Web mail provider may forward the email copies to third parties without the permission of the user whose email is copied to the Web mail provider.

One way to prevent unauthorized access to the contents (or attachments) of emails stored and served by a Web mail provider is to encrypt the emails before they are transmitted from the primary server to the Web mail system. Unfortunately, additional problems arise. As one example, the Web mail provider's native search tools will not be useable because the Web mail's search engine cannot build a meaningful index of encrypted data.

SUMMARY

Various techniques for encrypting, searching, and decrypting digital data, including email, Web mail, and documents, are disclosed, copies of digital data (e.g., pertaining to a user of an enterprise system) are encrypted and stored with a third party mail system. A search index corresponding to the encrypted data is stored with a third party computing system. In some embodiments, the search index is created such that possession of the index alone does not allow easy reconstruction of the information contained in the original digital data. A search engine, located outside the enterprise network, is accessible to users should the enterprise network become inaccessible.

Other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Environment

Figure 1:
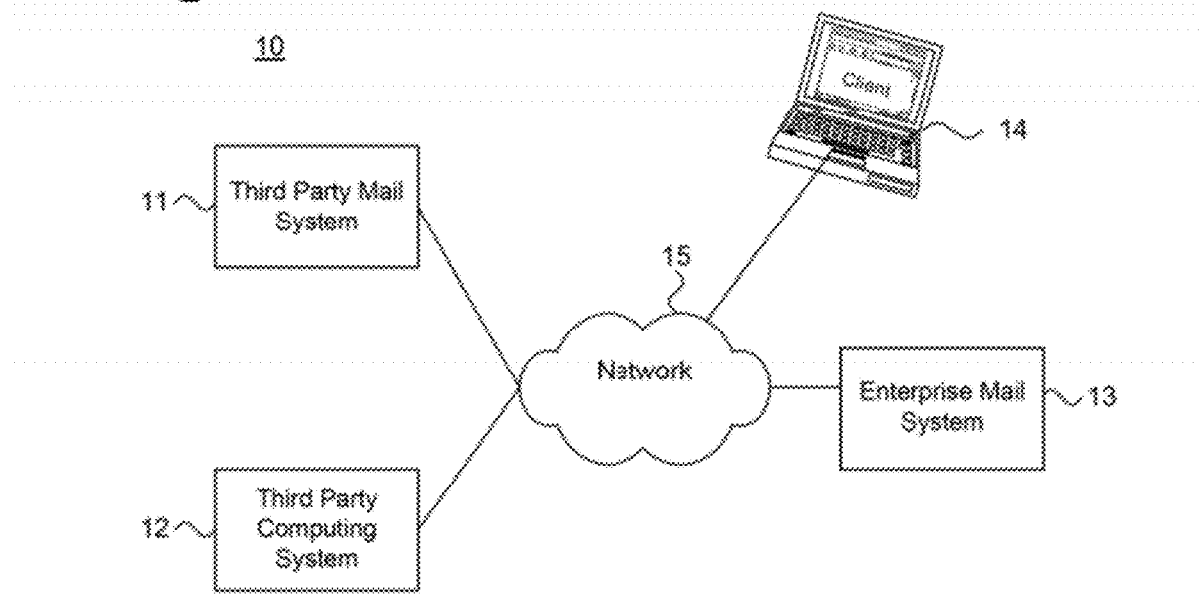
FIG. 1 is a functional block diagram showing, by way of example, an environment for providing secure remote email access in accordance with one embodiment.

FIG. 1 is a functional block diagram showing, by way of example, an environment 10 for providing secure remote email access in accordance with one embodiment. The environment 10 includes an enterprise mail system 13, as further described below with reference to FIG. 2; a third party computing system 12, as further described below with reference to FIG. 3; a third party mail system 11, as further described below with reference to FIG. 4; and an email client 14, for instance, an email application executing on a laptop or personal computer.

As described in more detail below, copies of email messages intended for users of enterprise mail system 13 are encrypted and stored with the third party mail system 11. A search index corresponding to the encrypted emails is stored with the third party computing system. Optionally, a key server containing the cryptographic keys that can be used to decrypt the emails stored with the third party mail system is provided by an entity other than the enterprise mail system.

The enterprise mail system 13, third party computing system 12, third party mail system 11, and the platform executing the email client 14 all include components conventionally found in general purpose programmable computing devices, such as a central processing unit, memory, input/output ports, network interfaces, and non-volatile storage. Other components could additionally be included or omitted as applicable.

The email client 14 can include email client programs, such Microsoft Outlook, Lotus Notes, and Mozilla Thunderbird. In addition, the email client 14 can be provided through a Web browser that is used to access network-provided Web mail or other alternative means of accessing email.

The enterprise mail system 13, third party computing system 12, third party mail system 11, and the platform executing the email client 14 and their components can either function as dedicated components, or operate in collaboration with other components. As well, their functionality may be duplicated on another system, and the techniques described herein adapted as applicable. In various embodiments, portions of the environments described herein can be combined (e.g., on to a single platform) or omitted as applicable. For example, key store 41 described in more detail below could reside on third party computing system 12, or could instead reside on a system (not shown) controlled by an entity other than the entity that controls the third party computing system 12.

Enterprise Mail System

Figure 2:
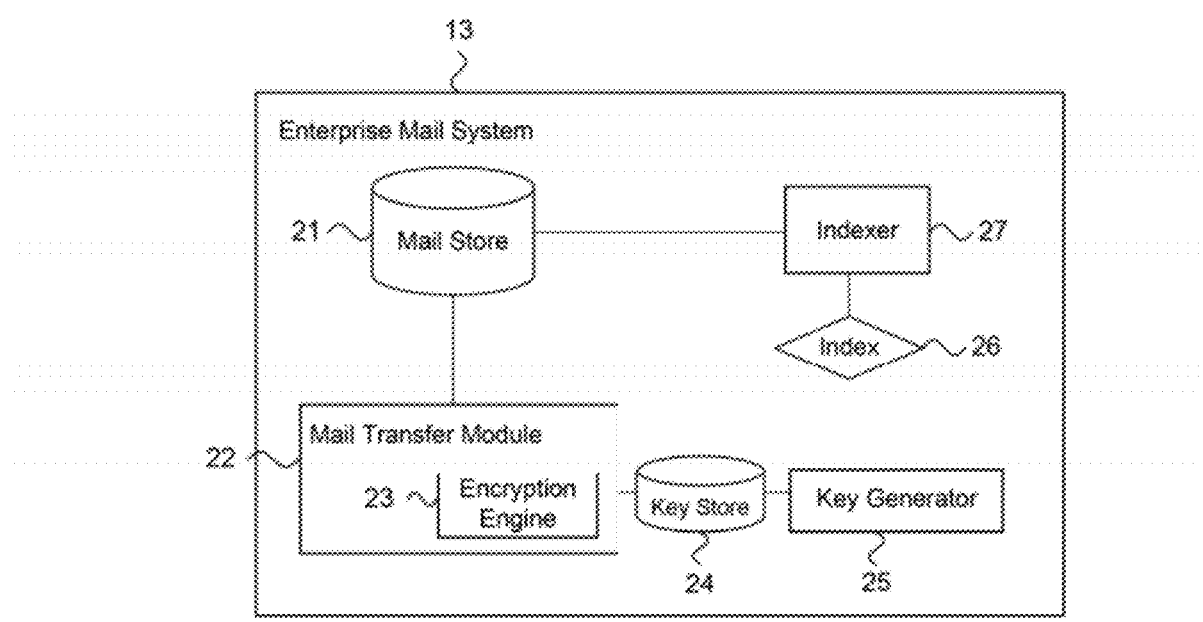
FIG. 2 is a functional block diagram showing the enterprise mail system used in the environment of FIG. 1.

Corporations and other enterprise-related organizations generally provide email support through an enterprise mail system. FIG. 2 is a functional block diagram showing the enterprise mail system 13 used in the environment 10 of FIG. 1. The enterprise mail system 13 includes a mail store 21, within which email messages and attachments can be stored, such as used by Microsoft Exchange, Lotus Domino, and UW-IMAP. In the example shown, a mail transfer module 22 is interfaced to the mail store 21 and further includes an encryption engine 23, which is in communication with a key generator 25. In various other embodiments, mail store 21 and encryption engine 23 are separate components. Cryptographic keys, generated by the key generator 25, are stored in a key store 24 accessible by the encryption engine 23. As explained in more detail below, in various embodiments, keys can also be generated by other key generators (e.g., located on a client computer) in addition to or instead of key generator 25. An indexer 27 is also interfaced to the mail store 21 and maintains an index 26 associated with the stored email messages and attachments. Other components can also be included in the enterprise mail system 13 as applicable.

Indexer

Email is indexed by indexer 27. For example, in some embodiments, indexer 27 obtains copies of the email from the mail store 21 using standardized email protocols, such as MAPI. During indexing, the indexer 27 performs a variety of tasks.

One task that the indexer performs is to ensure that a globally unique identifier (GUID) exists for each email. If the email already has a suitable GUID, the indexer can be configured to make use of it. If the email does not already have a suitable GUID, indexer 27 generates one as appropriate. Examples of suitable GUIDs or information that can be used to construct a GUID include the original message identifier, a combination of message header information (such as subject and date), a hash of the message body, and a randomly generated string. Additionally, the GUID can be associated with the message in a variety of ways, such as an X-header added by the indexer 27, a GUID added to the subject line of the email, a GUID added as the first or last line of the message, and as an attachment to the message (such as guid.txt). As described in more detail below, the GUIDs can be used to locate particular email messages stored with the third party mail system 11, even if the body text and any attachments to the email are encrypted and thus not searchable by the third party mail system itself.

Another task that indexer 27 performs is to index the headers, body text, and optionally any attachments to each email and incorporate the results into an index 26. In various embodiments, index 26 is constructed in such a way as to make reconstruction of the original content (e.g., the email messages/attachments) from the index difficult. As one example, a technique such as latent semantic analysis is used by indexer 27 to index the foregoing items. Other techniques can also be used as applicable.

Figure 4:
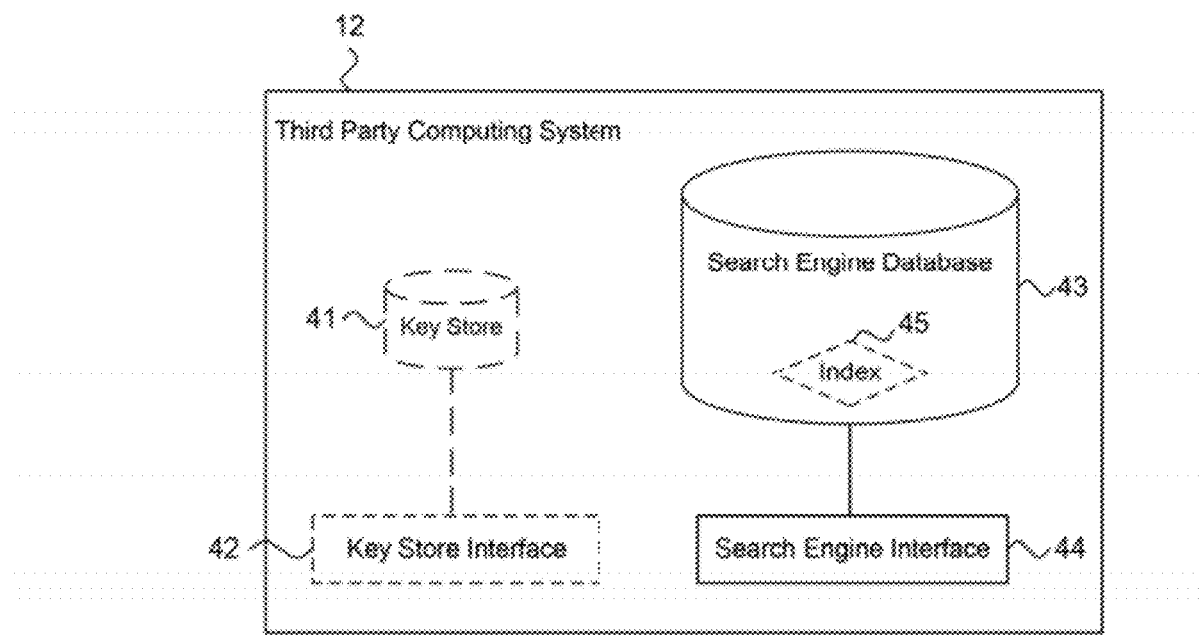
FIG. 4 is a functional block diagram showing the third party computing system used in the environment of FIG. 1.

Yet another task that indexer 27 performs in some embodiments is to periodically (or as needed) upload index 26 or portions thereof. As one example, index 26 is uploaded (as shown in FIG. 4) as index 45 to the search engine database 43 of the third party computing system 12.

Key Generator

Key generator 25 generates (or receives and stores) keys for encryption of email. In various embodiments, key generator 25 generates a public/private cryptographic keypair (e.g., compliant with a standard such as OpenPGP or S/MIME) for each user (or for groups of multiple users) either: (1) upon encountering a first email addressed to a particular user, or (2) through bulk key generation such as provided through a public, key infrastructure. Key generator 25 can also receive the appropriate keys from an entity such as the user him or herself, or from an administrator or other third party. For example, instead or in addition to generating a new keypair for a user, pre-existing keys previously assigned to the user are employed.

An example of one public key infrastructure that can be used in conjunction with the techniques described herein is described in commonly-assigned U.S. Pat. No. 6,978,025, entitled "Method and Apparatus for Managing Public Keys through a Server," issued Dec. 20, 2005, the disclosure of which is incorporated by reference. The generated (or received) key pairs are stored in the key store 24. In some embodiments, copies of keys are also retained within the enterprise—either within the enterprise mail system 13 itself, or on another node in the enterprise network (not shown). In various embodiments, rather than or in addition to public key cryptography, key generator 25 is configured to support symmetric keys, identity based encryption keys, and any other appropriate encryption technique such as semantic encryption. Examples of products that can be used or adapted to be used as key generators 25 include PGP Universal, the PGP SDK, OpenSSL, and Microsoft Crypto API.

Encryption Engine

Email is encrypted by the encryption engine 23. For example, once the email has been indexed, outfitted with a GUID (if applicable), and a key for the user has been imported or created, the email is encrypted with the user's key. Emails can be encrypted using OpenPGP, S/MIME, or other encryption methods, as applicable. In some embodiments, additional decryption keys or other encryption keys (e.g., keys associated with groups of users) can be applied, in addition to the user's key, Messages can either be encrypted, or digitally signed and encrypted. In an embodiment described in more detail below, messages are only digitally signed (and not encrypted).

Third Party Mail System

Figure 3:
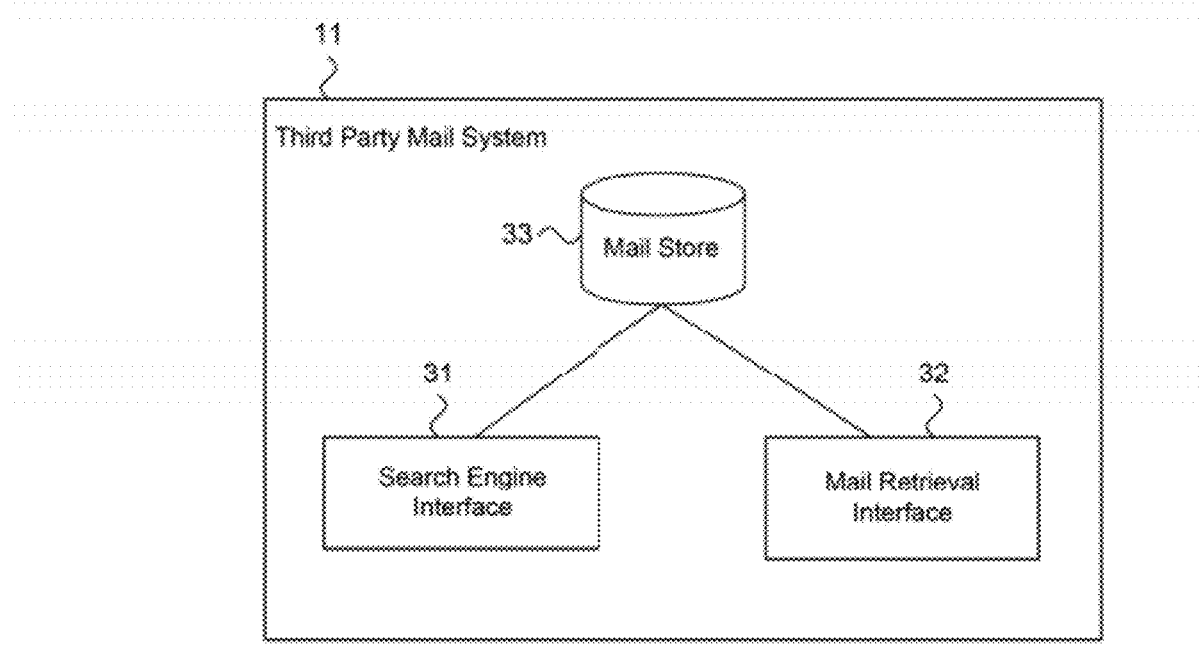
FIG. 3 is a functional block diagram showing the third party mail system used in the environment of FIG. 1.

FIG. 3 is a functional block diagram showing the third party mail system ("TPMS") 11 used in an environment such as the environment 10 of FIG. 1. In the example shown, the third party mail system exists outside the boundaries of the enterprise network and is accessible using a public data network, such as the Internet. The TPMS shown in FIG. 1 is controlled by an entity other than the entity that controls enterprise mail system 13.

The third party mail system 11 receives email that is also sent to enterprise mail system 13. Various techniques can be used for TPMS 11 to receive the email. For example, purpose-built applications, forwarding mail transfer agents, or other connectors can be employed, as applicable. The third party mail system 11 includes a mail store 33, within which the copies of the enterprise email messages (and applicable attachments) are stored. The third party mail system 11 includes both a mail retrieval interface 32 and as native search engine interface ("TPMS search engine interface") 31 that are both interfaced to the mail store 33. The mail retrieval interface 32 provides standardized email access through, for example, IMAP, POP, MAN, and Web mail protocols. The TPMS search engine interface 31 is used by email clients 14 (shown in FIG. 1) to locate and retrieve emails that match certain patterns, such as a GUID or other search strings, and facilitates local handling of remotely-generated search queries on the mail store 33, such as provided through Google's Gmail, Yahoo!'s Mail, and Microsoft's Hotmail. The third party mail system 11 can include other components as applicable, such as components to facilitate features and functions that are orthogonal to the techniques described herein.

Third Party Computing System

FIG. 4 is a functional block diagram showing the third party computing system ("TPCS") 12 used in the environment 10 of FIG. 1. In the example shown, the third party computing system is separate from the third party mail system and also exists outside the boundaries of the enterprise network.

The third party computing system 12 includes a search engine database 43 within which an index 45 is stored, and a search engine interface ("TPCS search engine interface") 44 that is coupled to the search engine database 43. The TPCS search engine interface 44 facilitates local handling of remotely-generated search queries on the search engine database 43. The third party computing system 12 further includes a key store 41 that is coupled to a key store interface 42. The third party computing system 12 can include other components, such as components to facilitate features and functions that are orthogonal to the techniques described herein.

Search Engine Database and Interface

The search engine of the third party computing system 12 includes the search engine database 43 and the TPCS search engine interface 44. As explained above, the indexer 27 (shown in FIG. 2) of the enterprise mail system 13 periodically or as needed uploads updates to the search engine database 43. In various embodiments, search engine database 43 and the TPCS search engine interface 44 do not reside within the enterprise network and also are not controlled by the same entity that controls the third party mail system 11. In doing so, outages on enterprise mail system 13 are protected against and any non-enterprise entities are prevented from linking keywords with emails stored on that system. As one example, if the emails are stored with GOOGLE Gmail, the search engine database 43 and the TPCS search engine interface 44 are hosted with the AMAZON E2 service. As described in more detail below, instead of or in addition to indexing and storing email messages, other forms of digital data (such as spreadsheets, reports, etc.) may be stored, indexed, and made accessible using the techniques described herein. In such a scenario, the documents can be stored with one entity while the corresponding index can be stored with a different entity accordingly.

The techniques described herein can also be used in conjunction with web-based services such as Google Apps and Windows Live. For example, users' data can be stored encrypted on the appropriate service's servers while search capabilities are provided using a search engine operating on another system physically located outside the trust boundary of the server hosting the digital data.

Key Store

In some embodiments, a key store 41 and associated key server are located on the third party computing system 12, which is separate from both the enterprise mail system 13 and the third party mail system 11. In so doing, in the event that keys stored within the enterprise are unavailable (e.g. due to an outage within the enterprise), cryptographic keys will remain accessible. In an example in which encrypted emails are stored on Gmail and the search engine database 43 and the TPCS search engine interface 44 are hosted on Amazon E2, the key store 41 can also be hosted on Amazon E2, with the key store 41 potentially being stored on Amazon S3. As another example, the third party mail system 11, the search engine database 43 and the TPCS search engine interface 44, and the key store 41 can be kept on systems located at three different locations. In various embodiments, the external (to the enterprise mail system 13) key store is omitted and users are responsible for storing applicable keys on their respective client devices.

Secure Remote Access to (Non-Email) Documents

Figure 5:
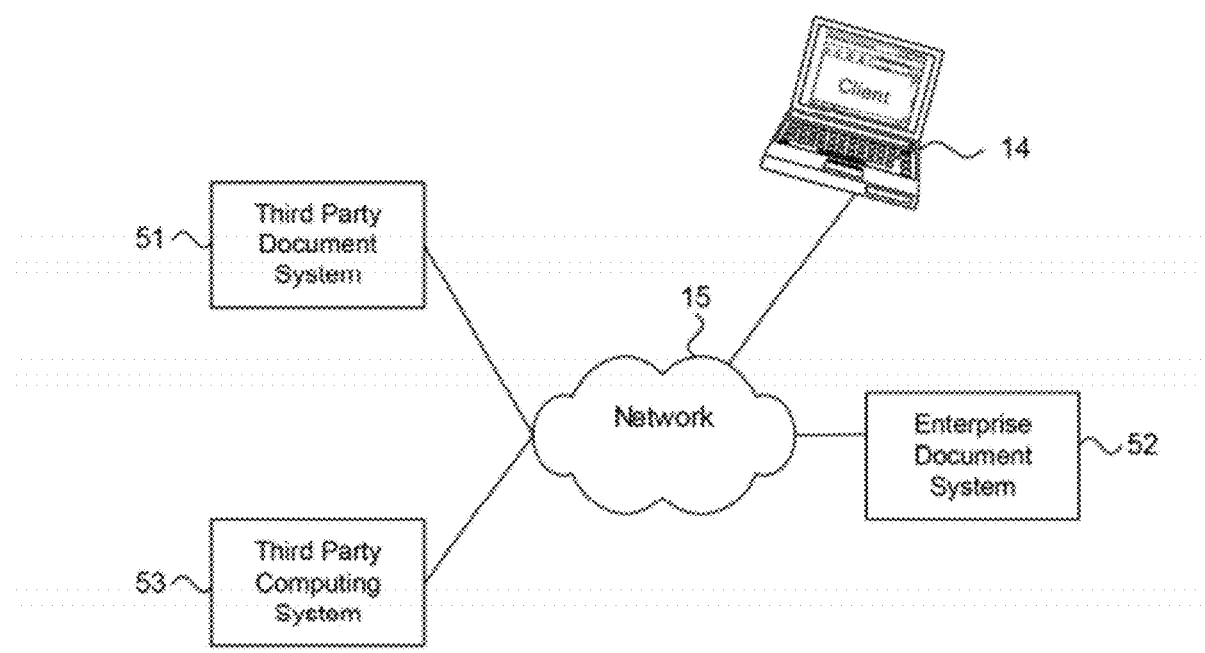
FIG. 5 is a functional block diagram showing, by way of example, an environment for providing secure remote access to documents.

FIG. 5 is a functional block diagram showing, by way of example, an environment 50 for providing secure remote access to documents. The techniques described above use email as an example, but are not limited to email in their application. Other suitable forms of digital data can also be indexed, encrypted, and otherwise manipulated according to the techniques described herein as well. Examples include electronically-stored document files, such as text, Microsoft Word files, Adobe PDF files, Excel files, Google Docs files, and the like, as well as other forms of stored data, such as healthcare data maintained in databases.

In the example shown, analogous to the secure email embodiments described above, when enterprise document system 52 is otherwise unavailable, client 14 is able to obtain documents from a third party document system 51 using search featured provided by third party computing system 53. Specifically, copies of documents intended for users of enterprise document system 52 are encrypted and stored with the third party document system 51. A search index corresponding to the encrypted document is stored with the third party computing system 53. Optionally, a key server containing the cryptographic keys that can be used to decrypt the documents stored with the third party document system is provided by an entity other than the enterprise document system.

EXAMPLES

Additional examples of ways in which email located outside the enterprise mail system can be made available for searching, and retrieval will now be discussed.

Search Plug-In Email

The email client 14 is configured to provide access to email, documents, or other electronically-stored digital data. In one embodiment, the client 14 includes an email client application, which can perform keyword searches of encrypted email using a search plug-in that processes queries for the email client. In a further embodiment, the user directly interacts with the plug-in, which receives search queries from a native search sub-system of the email client. In a still further embodiment, search capabilities are provided by a stand-alone application or widget, as applicable.

The search plug-in forwards each search query to the search engine interface 44 (shown in FIG. 4) of the third party computing system 12, which returns a list of emails that meet the search criteria, to the search plug-in. The emails can be identified by their GUID, or other identifier. To retrieve the encrypted emails, the email client 14 identifies and downloads the emails from the third party mail system 11 using the GUIDs. If the third party mail system 11 does not natively support the fetching of emails by GUM, the emails can be identified using other techniques, such as by using the third party mail system 11's native search feature to issue a search query for the GUM. For example, an Email Download Agent (EDA) can be used to generate a search URL for the GUID. Alternatively, the FDA can be used to access the third party mail system 11's search page and populate GUID information into the third party computing system 12's search form.

The EDA also downloads the encrypted entails from the third party mail system 11, Emails can be downloaded using standards-based email protocols native to the email client, such as IMAP, POP, or WebDAV. Other email protocols can also be supported as applicable. Email can also be downloaded by an email download plug-in, helper application, or similar module of the email client.

Downloaded emails are decrypted using messaging security software, such as PGP Desktop, PGP Messaging SDK, Outlook-native S/MIME, or similar programs. The cryptographic key necessary to decrypt the emails is obtained from the key store 41 (shown in FIG. 4) of the third party computing system through the key store interface 42. The key can be downloaded on-demand or have been downloaded previously and cached, and can also be stored locally on a client device in various embodiments. Decrypted entails are presented to the user by the email client 14 or other email viewing application.

Browser-Based Email

Emails can also be retrieved and viewed without the use of an email client, such as by using a Web browser or an Adobe Flex/Flash application to access encrypted emails. For Web browser-based email, the Web browser connects to the third party mail system 11's search engine, either directly or through another system. If the Web browser connects to the third party mail system 11 directly, client-side code substitutes the GUM for the search term before submitting a search query to the server. The substitution can be performed by JavaScript, a browser plug-in, an Adobe Flash application, a Web proxy, or other module or component. The substitution is obtained by connecting through the search engine interface 44 (shown in FIG. 4) of the third party computing system 12. Encrypted emails are retrieved from the third party mail system 11 and decrypted by the browser, plug-in, Adobe Flash application, Web proxy, or other program.

The cryptographic key necessary to decrypt the emails is obtained from the key store 41 (shown in FIG. 4) of the third party computing system 12 through the key store interface 42. The key can be retrieved either on-demand or have been downloaded previously and cached. In a further embodiment, operating system-native decryption capabilities can be leveraged to eliminate the need for the decryption tool to include cryptographic capabilities. Decrypted emails are presented to the user by the browser or other email viewing application.

By applying the foregoing techniques, an email encryption and decryption system can be created for use with standard popular Web mail systems, which can search and decrypt emails stored on the third party mail system 11 and encrypt emails sent via the same or another third party mail system 11.

Server-Only Email

Rather than performing the substitution of a search query for the GLAD and decryption on the client 14, one or more of those functions could instead be performed at a server. For example, a Web server and database can be hosted at the location of the third party computing system 12, or at another location, that assigns GUIDs to search. The GUID-based query into the third party mail system 11's email store can be created directly by that Web server, or by yet another system.

With the third party mail systems that provide email access using standard protocols, such as POP, IMAP, and WebDAV, emails can be decrypted for viewing, or other operation in an email client using server-based email decryption, such as PGP Universal. Web-based access to decrypted emails can be provided by a Web server that either decrypts emails locally or that relies on decrypting incoming emails that are transmitted using standard email protocols. For example, a Squirrel Mail Web front end could receive an email feed via an IMAP connection and server-based email decryption, such as PGP Universal, can act as a proxy to the IMAP server operated by the third party mail system 11. Other email Web front end products can be also used.

Further Email Examples

In a further embodiment, the third party mail system 11 includes native support for email decryption. For example, the third party mail system 11 can provide the decryption capability, with the cryptographic keys stored at a third party computing provider. Cryptographic keys can be retrieved from the third party computing provider with authentication, such as the private key for a user or a random symmetric key corresponding to a particular encrypted email. Such an approach limits exposure and enables the third party computing provider to choose to terminate the third party mail system 11's ability to access keys.

Auditable Proof of Data Flow Example

The techniques described herein are also applicable to providing an auditable proof of data flows to demonstrate which documents have been accessed and by whom. The auditable proof can be determined from access logs for the documents and to the cryptographic keys. Multiple levels of access control are thus provided. Moreover, access to the documents does not imply access to use of a cryptographic key to decrypt the documents.

Additionally, the techniques described herein are applicable to third-party "cloud" storage and computing providers with a separation of duties in which a compromise of stored data would require collusion among multiple parties. The techniques described herein also provide the ability to search and index encrypted data, and provide for auditable proof of data access through third party logs.

Figure 6:
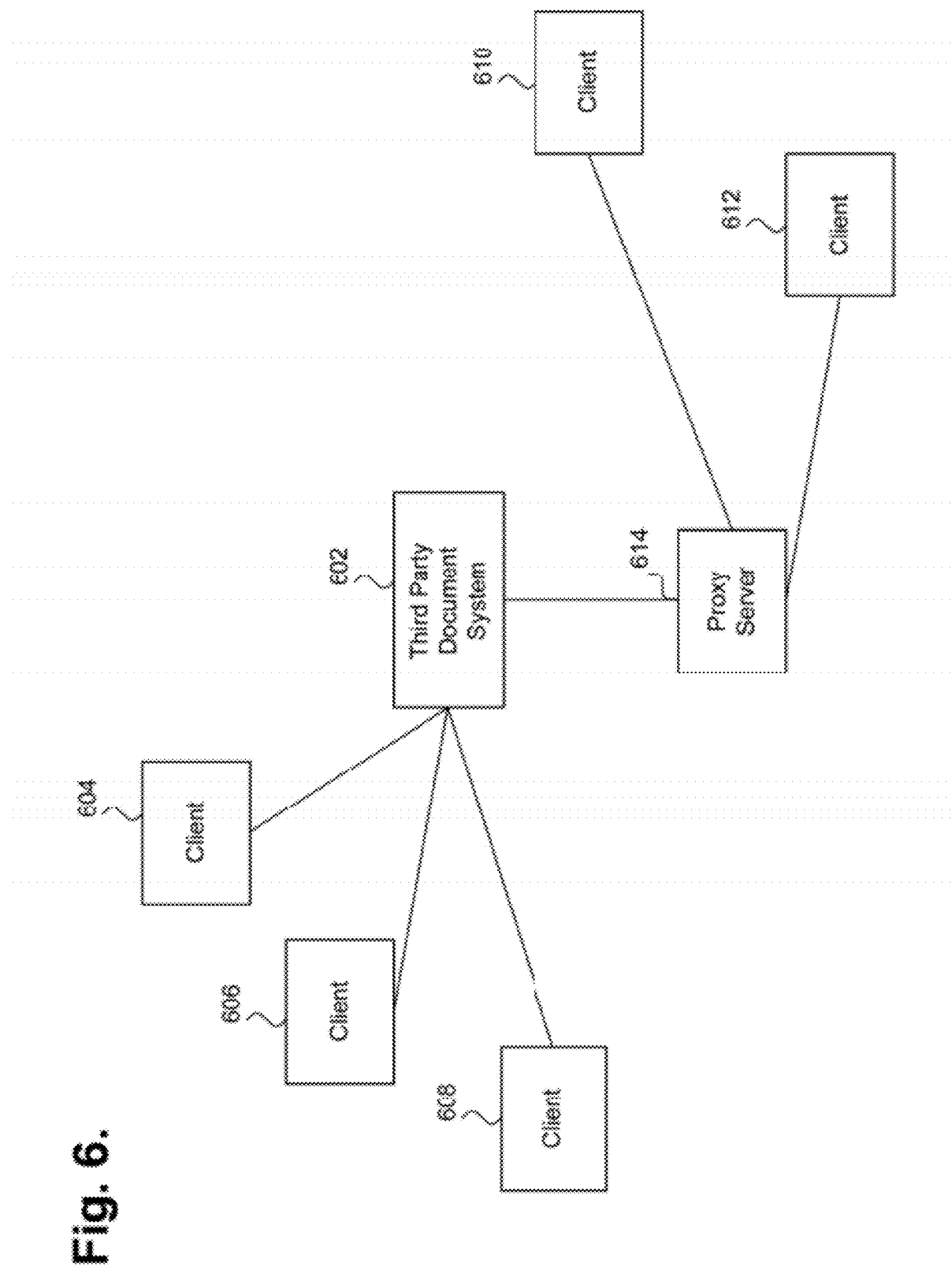
FIG. 6 is a functional block diagram showing various ways in which clients can communicate with a third party document system.

FIG. 6 is a functional block diagram showing various ways in which clients can communicate with a third party document system. In various embodiments, a third party document system, such as third party document system 602 can be used by clients (such as clients 604-608) to retrieve documents. Additionally, clients 610 and 612 are configured to retrieve documents in conjunction with a proxy server 614 that is in communication with third party document system 602.

In the example shown, client 604 includes a mail client program such as Microsoft Outlook. The mail client program is configured to obtain documents from the third party document system and process them via a plugin (using an appropriate protocol such as IMAP or POP) that is configured for that purpose. In some embodiments, the functionality of the plugin is natively provided by the mail client program and the plugin is omitted accordingly.

Client 606 includes a web browser program such as Microsoft Internet Explorer. The web browser program is configured to obtain documents from the third party document system and process them via a plugin (using an appropriate protocol such as HTTPS) that is configured for that purpose. In some embodiments, the functionality of the plugin is natively provided by the web browser program and the plugin is omitted accordingly.

Client 608 includes an operating system (such as Windows XP) that includes as a feature, the ability to browse file directories (e.g., with Windows Explorer). The file browser is configured to obtain documents from the third party document system and processes them via, a plugin (using an appropriate protocol such as WebDAV) that is configured for that purpose. In some embodiments, the functionality of the plugin is natively provided by the operating system and the plugin is omitted accordingly.

Client 610 and client 612 are configured to communicate with a proxy server 614. In the example shown, proxy server 614 is configured to obtain encrypted documents from third party document server 602 on behalf of client 610, overlay code (e.g. JavaScript, Flash, or Flex) that can be used at the client to decrypt the document, and provide the document and the code to client 610. The client obtains the key necessary to decrypt the document (e.g., from a cache or from a key server).

In the example shown, proxy server 614 is configured to obtain documents from third party document server 602 using an applicable protocol (e.g., POP, IMAP, etc.), perform decryption (at the proxy server) and provide the decrypted document to client 612. In this case, the proxy server is either configured to include an appropriate key store, or to otherwise obtain the keys necessary to process the documents received from document server 602. In some embodiments, proxy server 14 is configured to obtain data from third party document 602 using a first protocol/format (e.g., MAP) and to provide the data to a client, such as client 612, using a second protocol/format (e.g., HTTP web mail interface).

Figure 7:
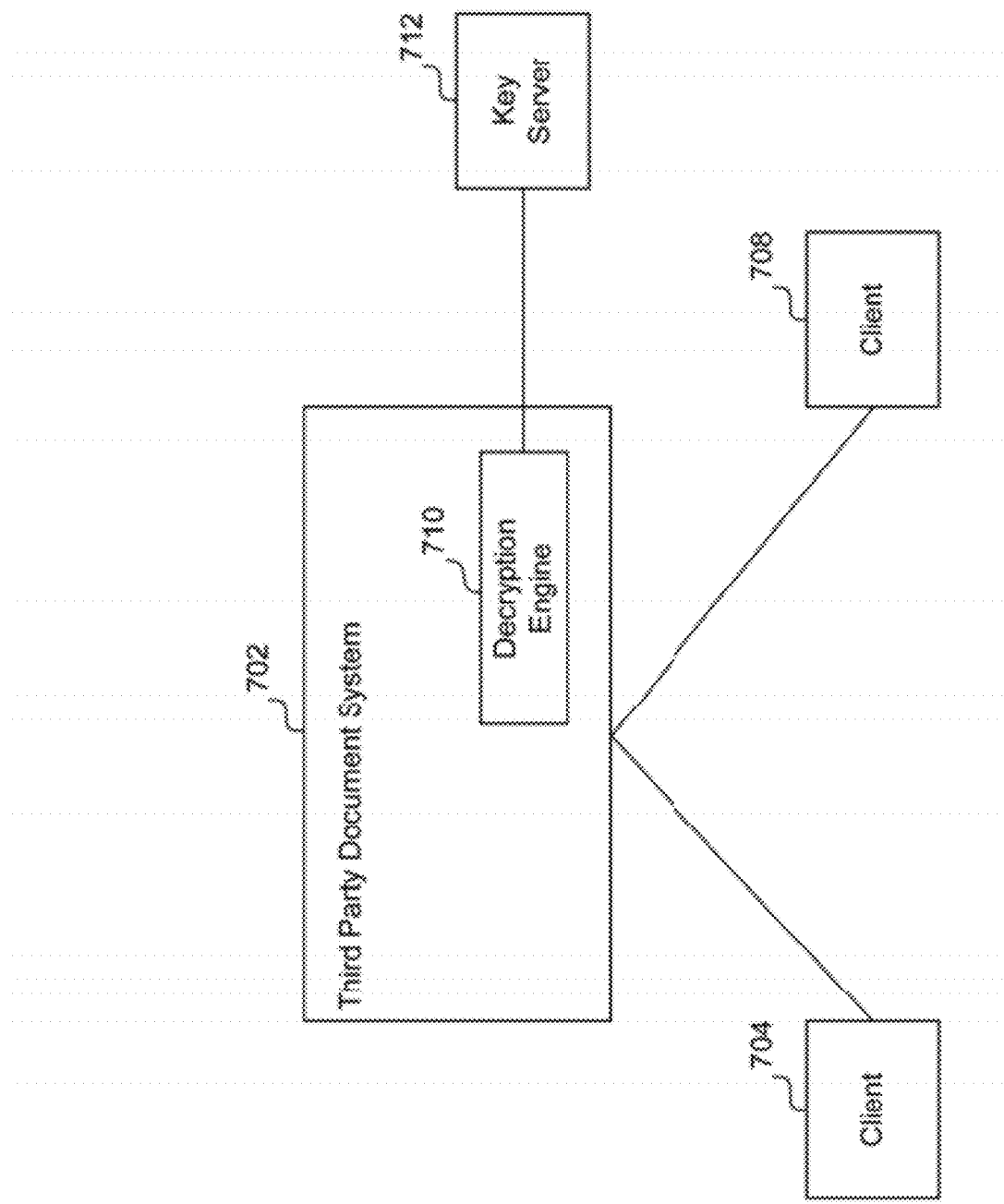
FIG. 7 is a functional block diagram showing an embodiment of a third party document system.

FIG. 7 is a functional block diagram showing an embodiment of a third party document system. As explained above, clients can be used to retrieve documents (e.g., email messages) from a third party document system when the enterprise server from which they would otherwise retrieve documents is unavailable. In various embodiments described above, it is assumed that the third party document server need not be modified (e.g. from what is presently available commercially) to implement the techniques described herein. For example, in FIG. 6, a proxy server 614 is used to facilitate clients 610 and 612 obtaining access to encrypted documents. In the example shown in FIG. 7, the third party document system has been modified (e.g., by an administrator of the third party document system) to support additional functionality that is not otherwise provided by such systems. For example, FIG. 7 is configured to provide the functionality that is otherwise provided by proxy server 614 in FIG. 6 and proxy server 614 is omitted.

In the example shown in FIG. 7, clients 704 and 708 are both configured to retrieve documents from a third party document server 702 and are similar to clients 610 and 612, respectively, of FIG. 6.

Client 704 includes a web browser program. The web browser program is configured to obtain documents from the third party document system 702 and process them using JavaScript (or other code) that is also obtained from the third party document system 702. In some embodiments, the client obtains the key from a source other than the third party document system (e.g., a cache).

Client 706 includes a web browser program. The web browser program is configured to request documents from third party document system 702, in the example shown, third party document system 702 includes a decryption engine 710 which is in communication with a key server 712. After client 708 requests a document from third party document system 702, decryption engine 710 requests the applicable decryption key from key server 712, decrypts the document immediately prior to transmission to client 708, and transmits the document to client 708. Accordingly, third party document system 702 neither stores documents in the clear, nor maintains keys other than for the brief period of time necessary to provide on-demand and just-in-time decryption of the appropriate documents.

While the invention has been particularly shown and described as referenced to the embodiments thereof, those skilled in the art will understand that the foregoing and other changes in form and detail may be made therein without departing from the spirit and scope.

What is claimed is:

1. A system for distributing a search index for encrypted messages, the system comprising:
   a storage device comprising a search index of at least a portion of a plurality of email messages stored in an email store, wherein the search index includes a first globally unique identifier (GUID) associated with a first email message; and
   a processor executing code comprising:
      code for providing the search index to a remote third party computing system;
      code for encrypting the first email message to create a first encrypted message;
      code for providing the first encrypted email message to a remote third party mail system; and
      code for generating GUIDs for the plurality of email messages and storing the GUIDs in the search index, wherein the remote third party computing system is configured to receive search index requests comprising searches for keywords and in response to provide a list of the generated GUIDs that are associated with the keywords in the search index.

2. A system according to claim 1, wherein the third party mail system is configured to receive email message retrieval requests comprising a GUID obtained from the third party computing system.

3. A system according to claim 1, the processor further executing code comprising:
   code for assigning the first GUID as an identifier of the first email message.

4. A system according to claim 3, wherein the first GUID comprises at least one of an original message identifier, a combination of message header information, a hash of the message, and a generated random string.

5. A system according to claim 1, wherein the processor further executes code for creating the search index at least in part by indexing one or more of keywords of a header, body text, and attachment into searchable data under the first GUID, wherein the searchable data precludes reconstruction of the first email message.

6. A system according to claim 5, wherein the searchable data is generated using latent semantic analysis.

7. A system according to claim 1, the processor further executing code comprising:
   code for providing a cryptographic key used to encrypt the first email message to a remote cryptographic key store.

8. A system according to claim 7, wherein the remote cryptographic key store is configured to provide the cryptographic key in response to a request for the key.

9. A method of distributing a search index for encrypted messages, comprising:
   creating a search index of at least a portion of a plurality of email messages stored in an email store, wherein the search index includes a first globally unique identifier (GUID) associated with a first email message;
   providing the search index to a remote third party computing system;

encrypting the first email message to create a first encrypted message;

providing the first encrypted email message to a remote third party mail system; and generating GUIDs for the plurality of email messages and storing the GUIDs in the search index, wherein the remote third party computing system is configured to receive search index requests comprising searches for keywords and in response to provide a list of the generated GUIDs that are associated with the keywords in the search index.

10. A method according to claim 9, wherein the third party mail system is configured to receive email message retrieval requests comprising generated by code executed by the processor of the system and obtained from the third party computing system.

11. A method according to claim 9, further comprising:
assigning the first GUID as an identifier of the first email message.

12. A method according to claim 11, wherein the first GUID comprises at least one of an original message identifier, a combination of message header information, a hash of the message, and a generated random string.

13. A method according to claim 9, wherein creating the search index includes indexing keywords of one or more of a header, body text, and attachment into searchable data under the first GUID, wherein the searchable data precludes reconstruction of the first email message.

14. A method according to claim 13, wherein the searchable data is generated using latent semantic analysis.

15. A method according to claim 9, further comprising:
providing a cryptographic key used to encrypt the first email message to a remote cryptographic key store.

16. A method according to claim 15, wherein the remote cryptographic key store is configured to provide the cryptographic key in response to a request for the key.

17. A system for distributing a search index for encrypted documents, the system comprising:
a storage device comprising a search index of at least a portion of documents stored in an electronic document repository, wherein the search index includes a first globally unique identifier (GUID) associated with a first document; and
a processor executing code comprising:
code for providing the search index to a remote third party computing system;
code for encrypting the first document to create a first encrypted document;
code for providing the first encrypted document to a remote third party document system; and
code for generating GUIDs for the documents and storing the GUIDs in the search index, wherein the remote third party computing system is configured to receive search index requests comprising searches for keywords and in response to provide a list of the generated GUIDs that are associated with the keywords in the search index.

18. A method of distributing a search index for encrypted documents, comprising:
generating a globally unique identifier (GUID) for each of a plurality of documents stored in an electronic document repository;
creating a search index of at least a portion of the plurality of documents, wherein the search index includes an association of keywords with the GUIDs of the documents that match the keywords, a first GUID associated with a first document;
providing the search index to a remote third party computing system, wherein the remote third party computing system is configured to receive search index requests comprising searches for keywords and in response to provide a list of the generated GUIDs that are associated with the keywords in the search index;
encrypting the first document to create a first encrypted document; and
providing the first encrypted document to a remote third party document system.

19. The system of claim 1, wherein the third party computing system and the third party mail system exist outside the boundaries of an enterprise network of the system.

20. The method of claim 9, wherein the search index requests are received from a remote email client, and wherein responsive to receiving the provided list of identifiers, the remote email client requests the email messages corresponding to the provided list of GUIDs from the remote third party mail system.

* * * * *